Feb. 13, 1951     G. S. BLUFORD ET AL     2,541,025
ARTILLERY AMMUNITION TRAINING ROUND
Filed Jan. 25, 1950     3 Sheets-Sheet 1
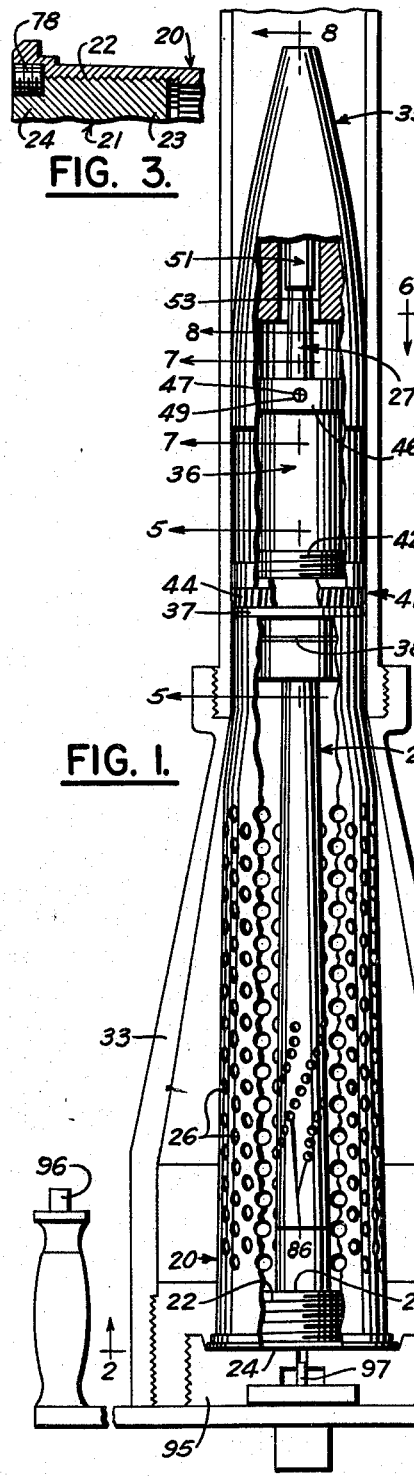
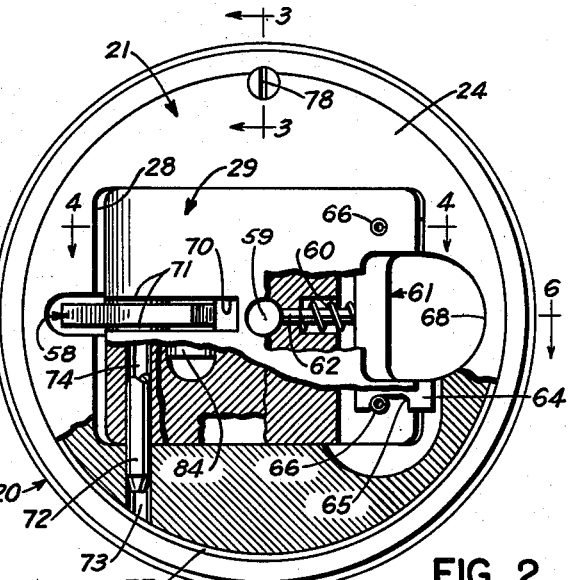
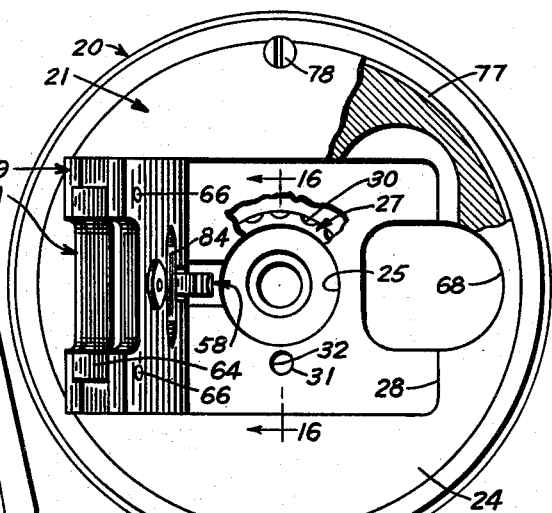
FIG. 3.
FIG. 1.
FIG. 2.
FIG. 15.
INVENTORS
GUION S. BLUFORD.
C. WALTON MUSSER.
BY
*G. J. Kosanich & J. H. Church*
ATTORNEYS Feb. 13, 1951 G. S. BLUFORD ET AL 2,541,025
ARTILLERY AMMUNITION TRAINING ROUND
Filed Jan. 25, 1950 3 Sheets-Sheet 2
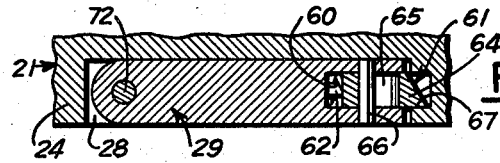
FIG. 4.
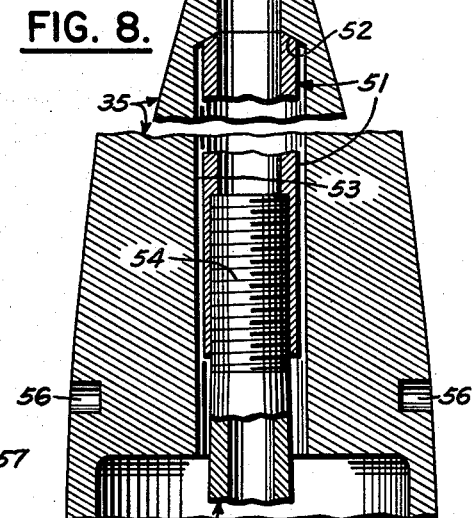
FIG. 8.
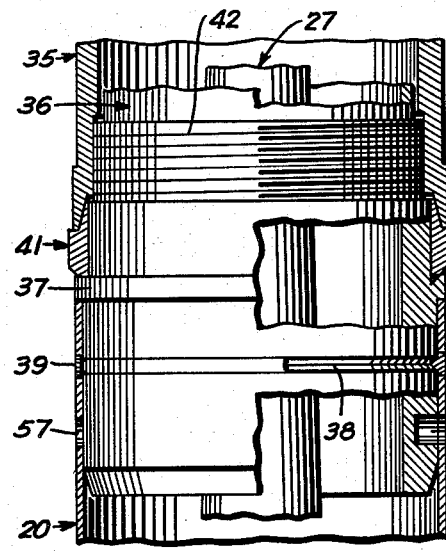
FIG. 5.
FIG. 9.
FIG. 7.
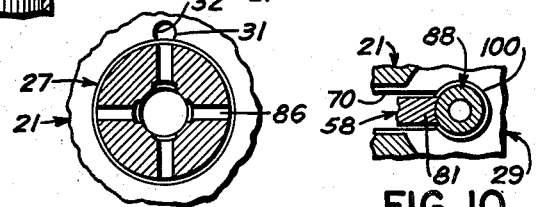
FIG. 10.
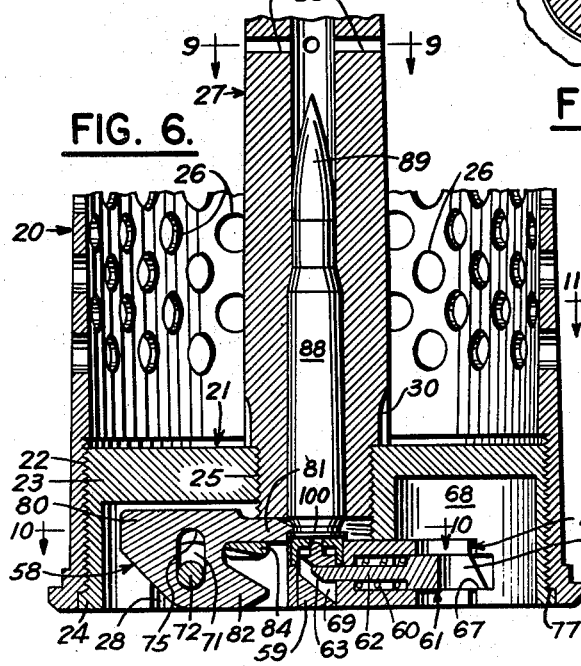
FIG. 6.
INVENTORS
GUION S. BLUFORD.
C. WALTON MUSSER.
BY
ATTORNEYS Feb. 13, 1951    G. S. BLUFORD ET AL    2,541,025
ARTILLERY AMMUNITION TRAINING ROUND
Filed Jan. 25, 1950    3 Sheets-Sheet 3

INVENTORS
GUION S. BLUFORD.
C. WALTON MUSSER.
BY
G. J. Kessenich & J. H. Church
ATTORNEYS.

Patented Feb. 13, 1951

2,541,025

UNITED STATES PATENT OFFICE 2,541,025

ARTILLERY AMMUNITION TRAINING ROUND

Guion S. Bluford, Philadelphia, and Clarence Walton Musser, Glenside, Pa.

Application January 25, 1950, Serial No. 140,531

11 Claims. (Cl. 89—29)

(Granted under the act of March 3, 1883, as amended April 30, 1928; 370 O. G. 757)

The invention described herein may be manufactured and used by or for the Government for governmental purposes without the payment of any royalty thereon.

Our invention relates to training rounds of ammunition for artillery weapons, and it has special reference to rounds which simulate artillery ammunition in their physical and ballistical characteristics but which employ less expensive small arms ammunition components as their only expendable material.

Broadly stated, the object of our invention is to adapt artillery ammunition so that, insofar as its external appearance, weight and handling characteristics, muzzle velocity and time of flight are concerned, the user of that ammunition in a heavy caliber gun will not find it substantially different from conventional heavy caliber ammunition, and yet effect a considerable saving in cost and strategic materials by actually firing small arms ammunition from the larger caliber weapon.

A more specific object is to provide a relatively inexpensive means of training military personnel in the technique of loading and firing artillery weapons of the older recoil and more modern recoilless types.

A further object is to provide a training round of the type described above which is simple and inexpensive to make, and the major components of which are usable over and over again.

A still further object is to provide such a training round which will function without there being required any modification of the artillery weapon in which it is to be used.

In practicing our invention we attain the foregoing and other objects by so modifying a standard artillery cartridge case that its head or base end includes a breech door and means for supporting the rear end of a "subcaliber" or small arms caliber rifle barrel such as that of a Browning machine gun. A coupler, adapted to support the forward end of the barrel, is further fitted onto the mouth end of the cartridge case, and an ogively shaped shell having an axial opening extending completely therethrough covers the coupler. When the novel ammunition is placed in its accommodating artillery weapon, firing of the weapon in the conventional manner operates a firing mechanism in the cartridge case's breech door. A small arms ammunition round previously placed in that breech block is thereby detonated and the small arms bullet fired from the larger caliber gun. A representative form of the present invention is shown by the accompanying drawings wherein:

Fig. 1 shows our novel training round, partly in section, as same appears when it is loaded into a conventional, tapered chamber, recoilless gun and the gun's breech door has been closed and locked preparatory to firing;

Fig. 2 is a view taken from line 2—2 of Fig. 1 to show the base end of our novel training round, part of the cartridge case's breech door having been torn away to illustrate the underlying structure;

Fig. 3 is a section on line 3—3 of Fig. 2 that shows a means for preventing relative rotation between the cartridge case and its breech block;

Fig. 4 is a section taken along line 4—4 of Fig. 2 to illustrate hinge and locking mechanisms of the cartridge case's breech door;

Fig. 5 is a view taken from line 5—5 of Fig. 1 primarily to show coupler-to-cartridge case and coupler-to-shell relationships;

Fig. 6 is a section taken along line 6—6 of Fig. 2 to show the breech door, firing and case extractor mechanisms of our inventive device;

Fig. 7 is a section on line 7—7 of Fig. 1 showing the manner in which the forward end of the machine gun barrel is secured in its proper position;

Fig. 8 is a section on line 8—8 of Fig. 1 showing the manner in which an extension to the small arms gun barrel is employed to fill in the forwardmost space in the shell which accommodates the front end of the rifle barrel;

Fig. 9 is a cross-sectional view from line 9—9 of Fig. 6 showing some of a number of holes drilled through the small arms rifle barrel's wall to connect with the barrel's rifling grooves, whereby to permit powder gases radially to emanate therefrom and issue through the perforated walls of the artillery size cartridge case;

Fig. 10 is a view taken along line 10—10 of Fig. 6 to show the small arms case extractor in position to extract a cartridge case of a spent round from our novel artillery training round;

Figure 13:
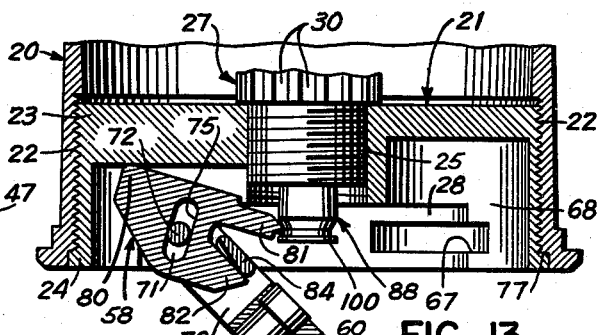
Figure 14:
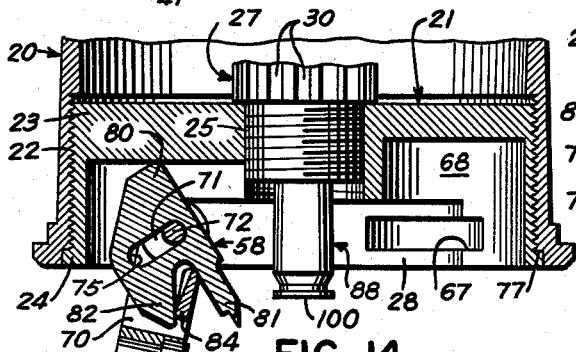
Figure 16:
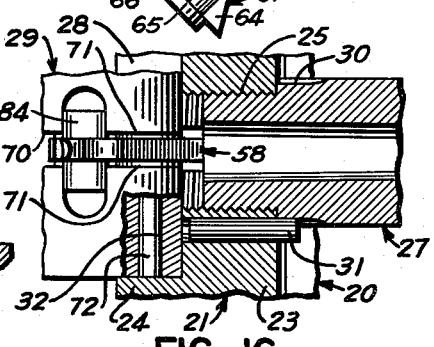
Figure 12:
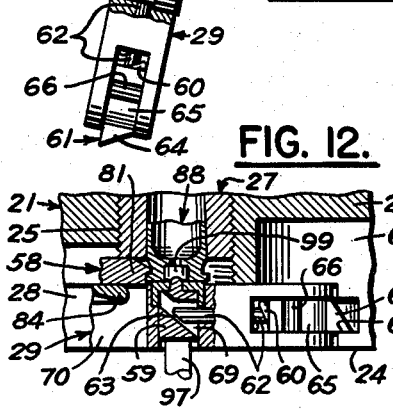
Fig. 12 is a sectional view duplicating the firing mechanism portion of Fig. 6, except that the firing pin is shown as having just struck the primer in the small arms case.
Figure 17:
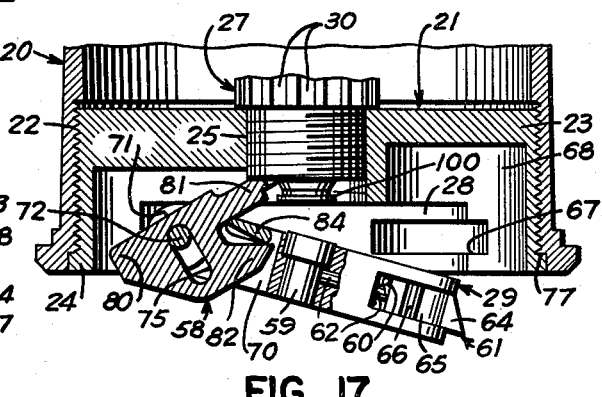
Figure 12:
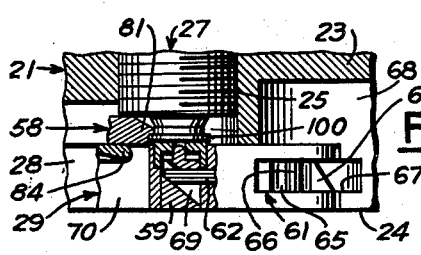

Fig. 12A repeats the Fig. 12 illustration, except that the latch mechanism has been actuated prior to opening the breech door and the firing pin has thereby been retracted;

Fig. 13 shows a progressive stage after the Figs. 12–12A illustrations, the breech door having been sufficiently withdrawn to show how the extractor operates to pull out the spent small arms case;

Fig. 14 completes the progressive illustrations of the opening of our novel training round's breech door to extract the spent case and replace it with a new small arms round;

Fig. 15 is a view similar to Fig. 2 looking in on the base end of our unique training round, except that the breech door has been opened to the Fig. 14 position;

Fig. 16 is a section taken from line 16—16 of Fig. 15 to show the pin which is employed to prevent relative rotation between the machine gun barrel and our invention's breech door housing; and Fig. 17 shows how the extractor moves into its appropriate operating position when the training round's breech door is closed.

World War II saw the development of a recoilless rifle termed by many experts as the first satisfactory one of its kind, and the subsequent adoption thereof as a standard armament item by the U. S. Army. This weapon, first devised for firing 57 mm. projectiles (see U. S. patent to W. J. Kroeger and C. W. Musser 2,466,714), and later applied to larger calibers such as 75 mm. (see U. S. Patent 2,472,111 which issued to the same inventors), was successfully tested in battle and troops trained in its use under actual battle conditions. However, once the war was over, consideration was given to the possibility of devising a means of training personnel in the use of this new weapon wherein the conditions of actual operation would be very closely simulated, but with the further object of diminishing the considerable expense and the strategic war materials involved in the manufacture of the ammunition required for such training purposes.

The problem to be solved, then, was to devise a means of adapting either the artillery ammunition or the weapon so that trainees could be given the opportunity to load and fire the gun in a conventional manner, while at the same time reducing expendable material to a minimum and enabling the re-use of as much of the strategic war material as possible. Preferably, of course, the modification should be made to the ammunition rather than the gun, in order that the many weapons which were made during and since the war should not require any further change and still be usable for training purposes. Thus, it was determined to be most desirable that an ammunition round be devised, whose weight, size and shape would be identical with a conventional cartridge use with the gun as, for example, the high explosive rounds illustrated in the abovementioned patents. Still further requirements were that distribution of the ammunition's weight should closely approximate that of the conventional round, and the firing characteristics should be such that the normal trajectory, time of flight, and reproducible accuracy of fire should be attained. To solve the above-outlined problem, and to attain the objects earlier enumerated, it appeared desirable to so modify a conventional round of ammunition for the artillery weapon that the large caliber round would remain the same externally, for all practical purposes, but that instead of artillery size projectiles being fired and propelled from the gun, a small arms bullet would be fired in lieu thereof to imitate the firing of the larger ammunition and thereby give trainees experience under situations closely simulating actual fire conditions.

From the description of our invention given below, it will be seen that we have very adequately solved the foregoing problem. It will further be appreciated that our invention need not necessarily be restricted to use only with recoilless-type firearms such as are illustrated in the accompanying drawings and in the aforementioned patents, but that instead the invention is equally applicable in the case of artillery weapons which fire ammunition having the older style, nonperforated cartridge cases. An additional feature of our invention, as will be disclosed below, is the fact that when applied to recoilless-type guns using the perforated cartride case, the simulated normal firing conditions are carried out so realistically that even the backward flash of powder gases through the open-breech venturi is duplicated.

CONSTRUCTION OF OUR INVENTION

*Major components comprised of modified conventional artillery round*

To make our inventive device, we may employ any conventional cartridge case normally used in the ammunition fired from a gun in whose use it is desired to train personnel. Thus, in the illustrated example, a 75 mm., perforated wall cartridge case is employed. The head or base end of this case is removed, or a hole drilled therethrough approximately equivalent in diameter to the internal diameter of the case at that end, and a rear portion of the case wall's inner surface is threaded. A cylindrical member, which we may term a breech block 21, is threadedly engaged therewith as indicated at 22 (see Fig. 6). The breech block houses important firing and case extractor mechanisms which will be described later.

Breech block 21 has a forward circular wall 23, and also a rear circular wall 24 which is designed to fit flush with the base end of cartridge case 20 (see Figs. 2, 15 and 24). The forward wall 23 has a central circular opening therethrough which is threaded to engage, as indicated at 25, a conventional machine gun barrel 27. The rear wall 24 has a rectangular opening 28 therethrough for accommodating a breech door 29. Housed in breech block 21 between the forward end or wall 23 and the rear wall 24 are firing and case extractor mechanisms which will be described later.

Machine gun barrel 27 may be any conventional rifle barrel, although for purposes of economy, the smaller caliber the barrel the better. It need not, in fact, be a machine gun barrel, for a carbine or other small rifle barrel will do as well. In the illustrated example, however, a conventional Browning machine gun, caliber .30, has been used. On the external wall of this barrel, at its rear end, are a number of longitudinal serrations or flutes 30 which are spaced around the barrel. One of these flutes, after the barrel is threadedly joined to the breech block as indicated at 25, serves to receive a pin 31 that projects forward from a hole 32 in the forward breech block wall 24 so as to prevent relative rotation between the breech block and barrel thereafter. The forwardmost end of barrel 27 projects out from the mouth of cartridge case 20 into the interior of an ogive shell 35 which simulates the forward portion of a conventional 75 mm. projectile that normally would be fired from the cartridge case and the gun 33 illustrated in Fig. 1.

The coupler 36 is secured as an extension to the mouth end of cartridge case 20 by any preferable means, such as by brazing. The coupler is cylindrical shaped, entirely hollow, and open at both ends. The diameter of the forward end is reduced so that it fits into the hollow rear end of shell 35. At the rear end of coupler 36 its external diameter is such that it snugly fits within the mouth of cartridge case 20. Fitting of the coupler into the cartridge case is limited by the coupler's shoulder portion 37 (see Fig. 5). To aid in securing the coupler within the cartridge case, there may suitably be provided on the external wall of the coupler a circumferential groove 38 located in a region which will coincide with one or more holes 39 provided in the wall of cartridge case 20. Molten brazing material may then conveniently be dropped through hole 39 and permitted to flow around groove 38 and thereby effect a substantial bond between the coupler and the cartridge case.

The remainder of coupler 36 which projects forwardly from the mouth of cartridge case 20 is of varying lesser diameters (see Fig. 5). The next adjacent diameter is of sufficient breadth to accommodate a rotating band 41 which may be merely slipped over the coupler into the Fig. 5 position where the band rests at its rearward end against shoulder 37. The next smaller diameter is a threaded portion 42 which serves to secure the artillery shell 35 placed thereover. From Fig. 5 it will be noticed that when shell 35 is threadedly attached to the coupler the rearmost end of the shell abuts the forward end of rotating band 41 to secure the band against forward movement. Thus, between the shell in front and shoulder 37 in the rear, an effective anchoring of the rotating band is accomplished to keep it in its proper position and to prevent it from rotation relative to the shell and case 20. In the drawings, rotating band 41 is shown as being of a preferred pre-engraved type 44 (see Fig. 1) which is desirable for inserting our inventive training round into guns with rifled bores. It will be noted from Figs. 1 and 5 that with the coupler, rotating band and shell in proper position, the overall assembly of our novel training round in all exterior aspects resembles a normal artillery round of ammunition. For further comparison reference may be made to the aforesaid Kroeger-Musser Patent 2,472,111 or to another U. S. patent of C. W. Musser's 2,456,011, where the identical 75 mm. type of ammunition is illustrated.

Figure 11:
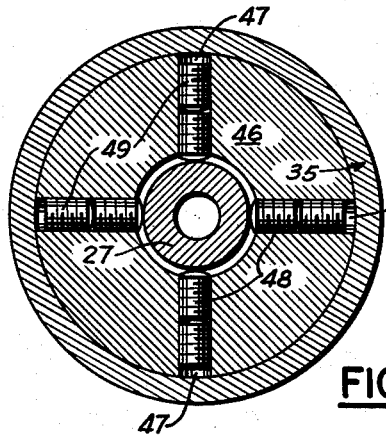
Fig. 11 is a section on line 11—11 of Fig. 7 showing the means whereby the forward end of the machine gun barrel is secured in its proper position, and further how the barrel can radially be adjusted to true up with the cartridge case breech at one end and at the other with the exit hole through the hollow shell of our novel training round.

After the coupler is brazed to the cartridge case, but prior to covering same with shell 35, it is necessary properly to position and secure within the coupler the forward end of rifled barrel 27. As reference to Fig. 11 will show, the forward end of coupler 36 has a ring-shaped wall portion 46. From the central opening to the outer surface of that wall 46 are threaded holes 47 of any convenient number, such as the four shown in Fig. 11, which will permit ready positioning adjustment of the barrel to be retained or secured therein. Positioning and securing of the gun barrel are accomplished by screws 48 located in threaded openings 47. Additional screws 49 are employed to reinforcingly back up and lock the positioning screws 48 in place.

With the aid of the just described means the forward end of machine gun barrel 27 is properly adjusted so that it will be aimed correctly in order that bullets fired therethrough will make proper exit from the forward or nose opening of shell 35. This done, the next step is to place an adapter or extension 51 on the forward end of barrel 27. As reference to Fig. 8 will show, the forward end of adapter 51 is shaped so that it abuts against a shoulder 52 in the shell's central axial cavity 53 which accommodates the front end of barrel 27. Adapter 51 is threadedly secured to the muzzle end of barrel 27 as indicated at 54, and by this means it is possible to adjust the length of the adapter which extends beyond the end of the gun barrel. This adapter 51 acts as a baffle and as a partial seal to lessen the deposition of powder residue between the parts enclosed by the shell.

Final assembly of our novel training round may now be accomplished by placing shell 35 in the position illustrated in Figs. 1 and 5, and threadedly engaging the shell to coupler 36 as indicated at 42. To aid in tightening the shell in this position there are provided a number of spanner holes 56 which extend from the outer shell surface radially a short distance to the shell wall. With the aid of a spanner wrench (not shown) placed in these holes, the shell may be securely tightened in place and thereby serve its additional function of securing rotating band 41 in the Fig. 5 position, as was earlier explained.

As an added aid in assembling the shell it is desirable to provide, as illustrated in Fig. 5, one or more spanner holes 57 through cartridge case 20. Then, by inserting a spanner wrench (not shown) in holes 57, cartridge case 20 may be held relatively immobile as shell 35 is tightened. This feature is particularly valuable when our novel device is assembled in the field where bench vises and the like may not be readily available. In drilling holes 57, a convenient procedure is first to assemble the coupler with respect to case 20, then drill directly through case and coupler in one operation, thereby assuring a uniform hole through the case wall and as far into the coupler wall as is necessary to accommodate the spanner wrench.

Breech and firing mechanisms of unique ammunition round

Now that the major components of our novel training round have been broadly discussed, attention may be directed to the various elements that make up the important breech and firing mechanisms. The illustrations which best show the construction of these parts are Figs. 2, 6 and 15, while the operation of these mechanisms, which will later be discussed, are shown in Figs. 12 through 17. Referring primarily to Figs. 2 and 6, it will be seen that the earlier mentioned breech door 29 houses a number of parts comprising the firing mechanism and a cartridge case extractor 58. The firing mechanism consists of a firing pin 59 and a spring 60-loaded latch member 61 which is T-shaped. The stem 62 of member 61 acts as a cam which serves to return firing pin 59 from the "after firing" to the "before firing" position. The cross head portion 64 of member 61, which is on the extremity of the latch member at the reader's right as viewed in Figs. 2 and 6, has a cut-out portion 65 on each of its free ends (see Fig. 2). Split cylindrical pins 66 are snugly fitted, one at each end, through accommodating holes extending transversely through the cross head portion of latch member 61 (see Fig. 2). These pins serve to limit, yet permit a certain amount of movement, namely, across the width of cutout portion 65 by the latch member from right to left and return as viewed by the reader in Figs. 2 and 6. When the latch member is in its fully extended position shown in Fig. 6, the crosshead portion 64 contacts a shoulder 67 in the breech block and thereby keeps the door in the illustrated closed and locked position. To unfasten the breech door and open same, all that an operator need do is to place his finger in opening 68 (see Figs. 2 and 15) and push portion 64 of the latch member to the left away from shoulder 67, then pull the door open.

When the latch member is pushed to the left, as when the breech door is being unfastened, spring 60 is compressed and the cam portion 62 likewise moves to the left thereby to cause the firing pin to move from a forward "fired" position (as in Figs. 12–12A) to a rearward "cocked" position (as in Fig. 6). This rearward movement of the firing pin is caused by the beveled free end 63 of the cam pushing against the wall of a slanted opening 69 in firing pin 59 (see Figs. 6, 12 and 12A) to make the pin ride along the cam. A fuller understanding of this construction will become available when the operation of the mechanism is discussed later.

The just described firing mechanism is installed within the breech door prior to mounting the door in the breech block. When mounting the door, extractor 58 is placed in the position indicated best by Figs. 2 and 6 between the walls of a slot 70. On each side of the extractor, or on the top and bottom, as viewed in the drawings, there is placed a resilient spring washer 71. The holes in the washers are aligned with an elliptically shaped hole 75 which passes through the extractor. Then a hinge pin 72 is snugly fitted through a hole 73 that extends from outside the breech block through the walls thereof into opening 28 and, with breech door 29 in the position of Fig. 6, the hinge pin is pushed into a matching hole 74 which extends through the width of the door passing through hole 75 in the extractor and the holes in washers 71. The lower portion of this hinge connection is illustrated in Fig. 2 wherein the wall has been torn away to expose it to view. A similar relationship exists in the upper portion although not shown in the drawings.

When the breech door has thus been hingedly connected to the breech block, and the breech block has been threadedly inserted into the base end of cartridge case 20, the hinge pin is prevented from falling out of position since the hole 73 through the breech block is closed off by the surrounding inner wall of the cartridge case (see Fig. 2). Thus in assembling our device, after the firing and extractor mechanisms are appropriately installed as described, the entire breech block is then screwed into the position shown by Figs. 1, 2 and 6 until the rear flange end of the block abuts a shoulder 77 provided therefor in the rear inner wall of cartridge case 20. To prevent relative turning thereafter between the breech block and the cartridge case, a screw 78 is threadedly inserted as shown in Figs. 2–3 between the adjacent external wall of the breech block and the internal wall of the cartridge case.

*Other construction details of illustrated device*

The shape of extractor 58 merits special consideration for its contour is very important to the extractor's functioning properly. As seen in Figs. 6, 13, 14 and 17, the extractor is an irregular flat plate having at one extremity a substantially right-angled cam surface 80 and at the opposite extremity a bifurcated construction comprising an extracting portion 81 and a striker portion 82. Mounted on one wall of slot 70 by any convenient means, as by brazing, is a substantially wedge-shaped striker bar 84 whose length is specially pre-selected to supply certain cam and lever actions as will later be made clear. When the extractor is installed within the breech door, its extracting and striker portions, 81 and 82 respectively, are made to straddle the striker bar as shown in Figs. 6, 13, 14 and 17.

The foregoing construction details of our novel device apply to the major essential components thereof. To meet special requirements other modifications will be required and can be made within the scope and spirit of the present invention. For example, in the illustrated apparatus which was especially designed for use with expanded chamber types of recoilless guns, it is obviously desirable for training purposes to simulate the conventional rearward flash of powder gases and flame which "regular" rounds fired from such guns would produce. To accomplish this there may conveniently be provided along the length of the machine gun barrel 27 a number of holes 86 through the wall surface thereof (see Figs. 1, 6 and 9). These holes are made so that they avoid the lands in the rifled barrel and instead coincide with the barrel grooves. As a result of providing these holes, when a small arms cartridge 88 is loaded into gun barrel 27 and is fired, the explosive powder gases issuing therefrom expand radially through holes 86 and out through the perforations 26 in the artillery case 20, then rearwardly from the gun's chamber 33 (Fig. 1) to the rear of the gun. The number of holes 86 which preferably should be provided is controlled by empirically determined factors such as the amount of rearward flash desired for simulation purposes, and the required amount of pressure needed to give a muzzle velocity to a small arms projectile 89 fired from the training round that will closely approximate the muzzle velocity and resultant trajectory of an actual artillery shell fired from the same gun.

OPERATION OF OUR NOVEL TRAINING ROUND

From the drawings and the foregoing description of the construction of our inventive device, its operation will be quite apparent to those skilled in the art. In preparing the round for training of personnel in the operation of artillery weapons, the appropriate small arms cartridge 88 is inserted into barrel 27. This may be done very simply by the operator, placing a finger in opening 58 (see Figs. 2 and 15) and applying light pressure on portion 64 of latch member 61 whereby the latch is moved from the reader's right to his left. This releases the latch and the breech door 29 may then be swung open to leave adequate room, as indicated in Fig. 14, for insertion of the small arms cartridge. Once that cartridge is inserted into the Fig. 6 position, the breech door 29 is closed and the latch member effects a locking of the door to the breech block 21. Optionally, this insertion of the small arms round into our novel device may be done by the trainee in the field or at some prior assembly point. In either event, once the training round is so loaded, it is then ready for actual use in training personnel in the use of the artillery weapon.

The demonstrator or trainee lifts up our novel round which, because of the conventional cartridge case 20, rotating band 41 and shell 35, has every outward appearance of a conventional artillery round. The breech block 95 of the standard artillery weapon, having previously been opened in the conventional manner, the operator thrusts the training round home in the gun as illustrated in Fig. 1, then closes and locks the gun's breech block 95. The firing operation is performed in the normal manner by depression of a trigger button 98 which causes the gun's firing pin 97 to spring rapidly forward to strike the training round's firing pin 59 (see Fig. 12) and detonate the primer 99 of the small arms cartridge 88. This results in explosion of the powder charge (not shown) in cartridge 88, forward flight of projectile 89 through barrel 27 out of the open nose of shell 35, and in the illustrated form of our device will also be accompanied by a flash of flame and gas which will pour through holes 86 in barrel 27 out through holes 26 in case 20 and thence out through the rear of the gun.

After this firing, it is of course possible to reload a small arms cartridge directly in the barrel 27 without removing the training round from the artillery weapon. However, the instructor will probably prefer to advise the trainee to remove the entire training round from the gun in order to get practice in following the conventional procedure of loading and re-loading the artillery weapon. Subsequent to this procedure, the training round may be re-loaded for re-use over and over again in the simple manner described below.

The latch member 61 is unlocked, as earlier explained. This unlocking movement causes the cam portion 62 of the latch member to move radially inward toward the center of the breech block from the Fig. 12 to the Fig. 12A position. This movement causes the firing pin 59 to slide rearwardly under pressure of the cam's beveled portion 63 on the slanted portion 69 of the firing pin, preventing accidental firing of the round. Then finger pressure is applied to the latch member to open same, and by simultaneously pulling it rearwardly the door is opened as shown in Fig. 14. As the door begins to open, the striker bar 84 thereon pushes the striker portion 82 of the extractor rearwardly and causes the extractor to pivot around hinge pin 72. By virtue of the elliptically shaped hole 75 through the extractor, and the extractor's right angled cam portion 80, the extracting portion 81 is made to move in a substantially axial line rearwardly until the breech door 29 is almost completely opened. In so moving, the extracting portion 81 pulls the small arms cartridge case by its head portion 100 rearwardly from barrel 27 until the case reaches the Fig. 14 position when the extractor becomes free thereof.

The small arms case is then manually withdrawn entirely from the training round and a new small arms cartridge is loaded into barrel 27, being placed therein as shown in Fig. 6. The breech door 29 is then closed and, in so doing, striker bar 84 pushes the extracting finger portion 81 forwardly in a straight line, which is adjacent but free of the small arms case, up to the position indicated in Fig. 17. It will be noted from that figure that the striker bar prevents rotation of the extractor out of this required straight line movement by the bar's contact with the striker portion 82 of the extractor. Final closing of the door from the Fig. 17 to the Fig. 6 position results in the extractor moving forward and at the same time, because of its elliptical hole 75, pivoting about hinge pin 72 so that the extracting portion 81 once again fits behind the head 100 of cartridge case 88. The closing of breech door 29 automatically moves the latch member's cross head portion 64, under urging of spring 60, into the locked position against the breech block shoulder 67. Since, as above explained, firing pin 59 has been returned to its cocked position by merely unfastening the latch member to open the breech door, the training round is once again ready for firing.

SUMMARY

From the foregoing description and the accompanying illustrations it will be obvious that we have adapted artillery ammunition so that, insofar as its external appearance, weight, and handling characteristics, muzzle velocity, and time of flight are concerned, the user of that ammunition in a heavy caliber gun will not find it substantially different from conventional heavy caliber ammunition, and yet will effect a considerable saving of cost and strategic materials by actually firing small arms ammunition in lieu of the costlier artillery ammunition components; that we have provided a relatively inexpensive means of training military personnel in the technique of loading and firing artillery weapons of the older recoil and more modern recoilless types; that we have provided a training round of the type described above which is simple and inexpensive to make, and the major components of which are usable over and over again; and that we have provided such a training round which will function without there being required any modification of the artillery weapon in which it is to be used.

Our inventive device thus has been shown to be very valuable and capable of wide application, and hence is not to be restricted to the specific form here shown and described by way of illustration.

We claim:

1. In a training ammunition round for recoilless firearms having a gas expansion chamber behind the barrel, the combination of a simulated projectile whose caliber equals that of the weapon with which it is intended to be used and which has an opening extending axially therethrough, a cylindrical cartridge case communicating at its front end with said projectile and having distributed throughout its circumference and length a plurality of openings through its wall surface, a ring-shaped breech block secured within the rear end of said cartridge case, a rifle barrel ventilated through its side wall and having its rear end secured to the front end of said breech block while its front end is supported within said projectile so that the barrel's bore is axially confluent with the opening through the projectile, a breech door pivotably mounted within an accommodating recess in the rear end of said breech block, latch means for selectively locking and unlocking said breech door to said breech block, and a firing mechanism carried by said breech door for use, when said door is in its closed and locked position, in firing a projectile from an ammunition round previously fitted into the rear of said rifle barrel.

2. In the device of claim 1, a cylindrical coupler attached at one end to the inner wall of the mouth of said cartridge case and at the other end, which protrudes forward of the cartridge case, having threads on its external wall surface whereby said simulated projectiles may be removably secured in continuous axial alignment with the cartridge case.

3. In the device of claim 1, a cylindrical adapter, whose bore is equivalent to and axially confluent with the bore of the projectile's axial opening and of the rifle barrel, mounted within the projectile for detachably supporting the front end of the barrel.

4. In the device of claim 1, an extractor fixture protruding from the forward face of said breech door for latching engagement over the rear rim of a cartridge case whose head protrudes from the rear end of said rifle barrel, whereby upon withdrawal of the door from the breech block the cartridge case is at the same time also partially withdrawn from the training round.

5. In a training ammunition round for artillery weapons, the combination of a simulated projectile whose caliber equals that of the weapon with which it is intended to be used and having an opening extending axially therethrough, a cylindrical cartridge case communicating at its front end with said projectile, a ring-shaped breech block secured within the rear end of said cartridge case, a rifle barrel whose rear end is secured to the front end of said breech block and whose front end is supported within said projectile so that the barrel's bore is axially confluent with the opening through the projectile, a breech door pivotably mounted within an accommodating recess in the rear end of said breech block, latch means for selectively locking and unlocking said breech door to said breech block, and a firing mechanism carried by said breech door for use, when said door is in its closed and locked position, in firing a projectile from an ammunition round previously fitted into the rear of said rifle barrel.

6. In the device of claim 5, a cylindrical coupler attached at one end to the inner wall of the mouth of said cartridge case and at the other end, which protrudes forward of the cartridge case, having threads on its external wall surface whereby said simulated projectile may be removably secured in continuous axial alignment with the cartridge case.

7. In the device of claim 5, a cylindrical adapter, whose bore is equivalent to and axially confluent with the bore of the projectile's axial opening and of the rifle barrel, mounted within the projectile for detachably supporting the front end of the barrel.

8. In the device of claim 5, an extractor fixture protruding from the forward face of said breech door for latching engagement over the rear rim of a cartridge case whose head protrudes from the rear end of said rifle barrel, whereby upon withdrawal of the door from the breech block the cartridge case is at the same time also partially withdrawn from the training round.

9. In a training ammunition round for artillery weapons, said round being optionally non-expendable and usable for firing lesser caliber projectiles therethrough, the combination of a chamber formed from the rearward portion of the round's cartridge case, a breech block removably secured within said chamber, a rifle barrel of lesser caliber than the training round secured to and extending axially forward from the forward portion of said breech block, a breech door movable into and out of the rearward portion of said breech block, a firing pin disposed within said breech door and movable axially thereof between a forward firing position and a rear cocked position, a cam member connected at one end to said latch member and at the other end associated with an accommodating slot in said firing pin whereby unlocking pressure applied to the latch member causes the cam member to move the firing pin into its rear cocked position, and a spring which urges said latch member to protrude from said breech door into effective locking position and simultaneously urges said cam member to a position in the accommodating slot which leaves said firing pin free for axially forward movement when the necessary firing force is applied thereagainst.

10. In the device of claim 9, an extractor fixture protruding from the forward face of said breech door for latching engagement over the rear rim of a cartridge case whose head protrudes from the rear end of said rifle barrel, whereby upon withdrawal of the door from the breech block the cartridge case is at the same time also partially withdrawn from the training round.

11. In the device of claim 9, an extractor fixture pivotably mounted in said breech door and protruding for eccentric movement from the door's forward face, said fixture comprising a right-angled cam portion and opposite thereto a bifurcated structure consisting of a forward extracting portion and a rearward striker portion, and a striker bar mounted on said breech door between said fixture's extracting and striker portions, whereby when the breech door is being closed the striker bar pushes the fixture's extracting portion into position for latching engagement over the rear rim of a cartridge case protruding from the rear end of said rifle barel, and when the beech door is opened the striker bar pushes the fixture's striker portion so as to pivot the fixture and enable its cam portion to coact with the adjacent wall of said breech block and move the fixture rearwardly along the said rear rim of the cartridge case being extracted.

GUION S. BLUFORD.
CLARENCE WALTON MUSSER.

No references cited.